April 15, 1941.   U. C. TAINTON   2,238,194
RECOVERY OF METALS FROM ORES
Filed July 27, 1938
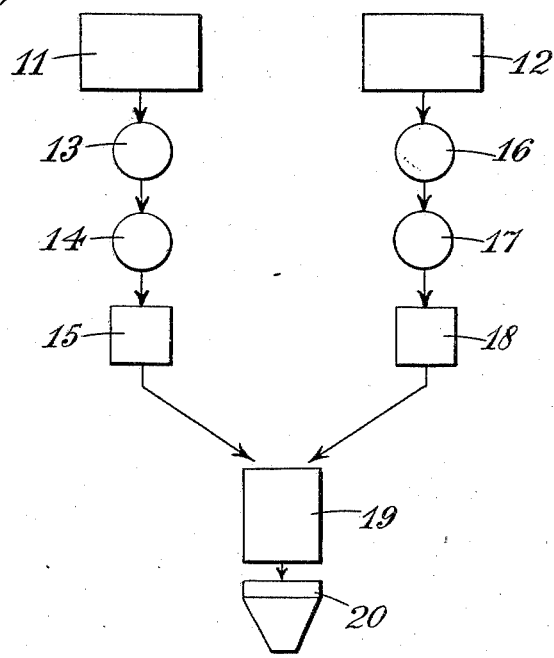
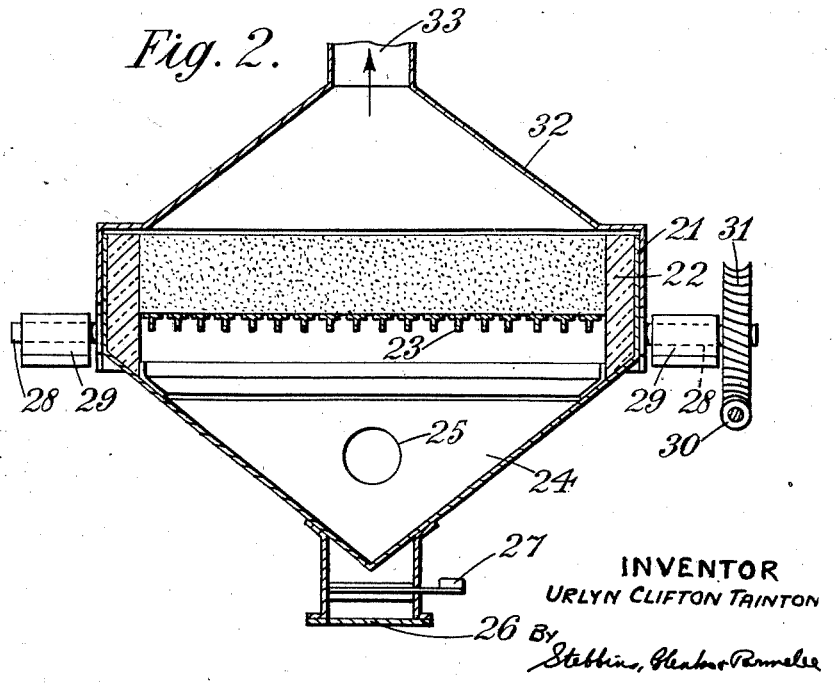
INVENTOR
URLYN CLIFTON TAINTON
ATTORNEYS Patented Apr. 15, 1941

2,238,194

UNITED STATES PATENT OFFICE 2,238,194

RECOVERY OF METALS FROM ORES

Urlyn Clifton Tainton, Baltimore, Md.

Application July 27, 1938, Serial No. 221,539
In Great Britain September 1, 1937

7 Claims. (Cl. 75—89)

This invention is for improvements in or relating to the recovery of metals from ores and deals more particularly with the recovery of tin, bismuth, arsenic and antimony from ores containing them.

I have found that by a special heat treatment of ores containing metals or metalloids (hereinafter collectively referred to as metals) which form relatively volatile compounds, e. g. sulphides, it is possible to separate and recover such metals by volatilisation of the volatile compounds and that the method is capable of successful application to ores such as low grade tin ores containing insufficient tin to permit of their commercial treatment by present-day methods.

The present invention accordingly consists in a process for the recovery of metals particularly tin from ore which consists in subjecting the particles of the crushed ore at high temperature to a current of gas containing sulphur dioxide so as to convert the metals to volatile compounds.

The gas passed through the ore may consist of air and the sulphur dioxide may be formed by interaction of the oxygen of the air with sulphur contained in the ore itself as sulphide or added to the ore.

The temperature attained should normally be above 700° C. but below the point at which substantial slagging of the ore takes place. Certain sulphide ores commonly contain sufficient combustible sulphur to enable the necessary temperature to be reached and maintained without addition of other fuel but it is within the scope of this invention to mix with the ore a proportion of sulphide, e. g. iron pyrites, or native sulphur to bring the sulphur content of the mixture up to, say, 12 to 14%. Other fuel such as coke or coal may be substituted wholly or in part for the added iron sulphide or sulphur.

In the normal application of the process each particle of the mineral is subjected to a sequence of treatments which consists first in heating under non-oxidising conditions in the presence of sulphur dioxide and water vapour, then progressively raising the temperature to 700° C. or over and finally cooling under oxidising condition.

In carrying out the process the ore is first ground to a size sufficient to permit the liberation of the values at the temperature employed. Frequently it is not necessary to grind finer than 20 mesh I. M. M. and in certain cases the material may be as coarse as ½ inch.

The ground ore may be mixed with a proportion, e. g. 10% of water before being introduced into the furnace, which is preferably of a type adapted for up-draught combustion. Combustion is started electrically or by means of a bed of coals and proceeds through the charge volatilising substantially completely the tin, arsenic, antimony and bismuth present. With a sulphur content of the amount mentioned above, viz. 12 to 14%, these elements are removed in the form of their volatile sulphides. When down-draught combustion is employed the mixture is spread upon a grate and suction applied below, the ore being ignited from above by means of a flame.

The thickness of the charge may vary from 6 to 12 inches or upwards according to the operating conditions.

In certain cases the results may be improved by adding to the charge a proportion of chloride such as sodium chloride and this may conveniently be applied in the form of an aqueous solution. It will be understood, however, that the presence of chlorides is not essential to the invention.

The invention may be carried out by means of a sintering machine of known type provided with a hood and flue for the recovery of the volatilized metallic compounds.

Following is a description by way of example and with reference to the accompanying diagrammatic drawing of one method of carrying the invention into effect in the treatment of an ore containing a small proportion, e. g. 1% of tin.

In the drawing:

Figure 1 shows a flow sheet of the process when applied to a mixture of oxidised and sulphide ores;

Figure 2 is a vertical section of one form of furnace which may be used for the intermittent treatment of ore.

Referring to Figure 1, oxidised and sulphide ores are stored in storage bins 11 and 12 respectively. The oxidised ore is passed through a primary crusher 13, and a finer crusher 14 which may take the form of a rod mill or ball mill capable of reducing the ore to about 10 mesh I. M. M. and is then passed into a storage bin 15. The sulphide ore is similarly passed through a primary crusher 16, and a finer crusher 17 to a storage bin 18. A mixture of crushed ores is fed from storage bins 15 and 18 to a mixer 19 and thence to a storage bin 20 from whence it may be fed as required to the furnace in which the heat treatment of the ore is to take place.

Referring to Figure 2, the furnace consists of a sheet steel casing 21 lined with refractory material 22 and provided with T-section fire bars 23. The lower part of the furnace terminates in a conical shaped chamber 24 having a conduit 25 for blowing air through the charge. The apex of the cone is provided with a discharge hole 26 fitted with a gate 27 for removing any material which may fall between the bars 23. The furnace is mounted on a horizontal shaft 28 turning in bearings 29 and tilted by means of a worm and worm wheel 30 and 31 and is covered by means of a movable hood 32 provided with a conduit 33 for leading away volatilised material.

The bars 23 are so spaced as to prevent appreciable amounts of crushed ore from falling into the chamber 24.

The charge of mixed and crushed ore which may contain about 10% water and between 12 and 14% sulphur is fed into the furnace to form a bed between 9 and 12 inches thick and the charge is ignited by passing an electric current through certain or all of the fire bars 23 (which may be made of a nickel/chromium alloy and which may be arranged in series or in parallel or in series/parallel) to bring the charge in contact therewith up to ignition point or by burning gas below the fire bars. The furnace is brought under the hood 32 which is arranged to fit closely to the furnace and air is blown in through the conduit 25. The volatile metallic compounds are driven off through the conduit 33 as the charge burns through. After the charge has been burnt out (which takes place in about 20 minutes) the hood 32 is removed, the furnace tilted to discharge the burnt ore and a further charge of ore is fed into it. Extractions in excess of 95% of the tin may be obtained.

It will be understood that with a sulphide ore of suitable grade containing e. g. 12 to 14% sulphur, it may be unnecessary to employ any oxidised ore. To obtain the best results the conditions must be carefully controlled so as to provide a mixture of oxide and sulphide of as nearly as possible uniform composition.

In an alternative method of carrying out the process the mixture of oxidised and sulphide ores is fed into pan-shaped furnaces running on a track so that they can be brought in turn beneath the hood of a flue for the recovery of volatile solids.

I claim:

1. A process for the recovery of tin from an ore poor in tin in a single operation and as a volatile compound which process consists in crushing the tin ore, mixing the crushed ore with crushed iron pyrites so as to bring the proportion of sulphur to substantially 12 to 14% of the mixture, adding water in amount of the order of 10% by weight of the crushed ore and subjecting a stationary layer of the crushed and mixed ore to progressive and direct heating to a temperature above 700° C. but below the point at which substantial slagging of the ore takes place, said heating being effected by combustion of a sulphur component in the charge whereby the said metals are converted to volatile sulphide compounds under reducing conditions, and leading away and condensing the said volatile compounds.

2. A process as set forth in claim 1 wherein the layer of crushed ore is not less than 6 inches thick.

3. A process for the recovery of tin as a volatile compound from a low grade tin ore, which process consists in bringing the sulphur content of the crushed ore substantially to 12 to 14%, adding water in amount of the order of 10% by weight of the crushed ore, subjecting the crushed ore to progressive and direct heating to a temperature about 700° C. but below the point at which substantial slagging of the ore takes place, said heating being effected by passing air through the crushed ore and causing combustion of a sulphur component in the charge whereby the tin is converted to volatile compounds under non-oxidizing conditions, and leading away and condensing the said volatile compounds.

4. A process for the recovery of tin from a poor tin ore in a single operation and as a volatile compound, which process consists in separately crushing an oxidized tin ore and iron pyrites, mixing the said crushed ores so that the proportion of sulphur is substantially 12 to 14% of the mixture, adding water in amount of the order of 10% by weight of the crushed ore, subjecting a layer of the crushed and mixed ore to progressive and direct heating to a temperature above 700° C. but below the point at which substantial slagging of the ore takes place, said heating being effected by combustion of a sulphur component in the charge whereby the said metals are converted to volatile sulphide compounds under reducing conditions, and leading away and condensing the said volatile compounds.

5. A process for the recovery as a volatile compound from a low grade ore of a metal selected from the group consisting of tin, bismuth, arsenic and antimony, which process consists in bringing the sulphur content of the ore substantially to 12 to 14% and subjecting the crushed ore in a porous stationary layer to progressive and direct internal heating to a temperature above 700° C. but below the point at which substantial slagging of the ore takes place, said heating being effected by passing air through the layer of ore to bring about local combustion of a sulphur component in the charge whereby the said metals are converted to volatile sulphide compounds which are not immediately oxidized but are condensed in the layer of ore immediately ahead of the fire zone and are finally expelled as sulphides from the charge when the fire zone reaches the surface of the charge, and leading away and collecting the metal compounds driven off.

6. A process for the recovery as a volatile compound from a mixture of carbonaceous material and a low grade ore of a metal selected from the group consisting of tin, bismuth, arsenic and antimony, which process consists in subjecting the crushed ore in a porous stationary layer and in the presence of sulphur to progressive and direct internal heating to a temperature above 700° C. but below the point at which substantial slagging of the ore takes place, said heating being effected by passing air through the layer of ore to bring about local combustion of a sulphur component in the charge whereby the said metals are converted to volatile sulphide compounds which are not immediately oxidized but are condensed in the layer of ore immediately ahead of the fire zone and are finally expelled as sulphides from the charge when the fire zone reaches the surface of the charge, and leading away and collecting the metal compounds driven off.

7. A process for the recovery as a volatile compound from a low grade ore of a metal selected from the group consisting of tin, bismuth, arsenic and antimony, which process consists in bringing the sulphur content of the ore substantially to 12 to 14% by adding a crushed sulphide ore thereto and subjecting the crushed ore in a porous stationary layer to progressive and direct internal heating to a temperature above 700° C.

but below the point at which substantial slagging of the ore takes place, said heating being effected by passing air through the layer of ore to bring about local combustion of a sulphur component in the charge, whereby the said metals are converted to volatile sulphide compounds which are not immediately oxidized but are condensed in the layer of ore immediately ahead of the fire zone and are finally expelled as sulphides from the charge when the fire zone reaches the surface of the charge, and leading away and collecting the metal compounds driven off.

URLYN CLIFTON TAINTON.